US009879384B2

United States Patent
Koumoto

(10) Patent No.: US 9,879,384 B2
(45) Date of Patent: Jan. 30, 2018

(54) TRAVELLING VEHICLE SYSTEM

(71) Applicant: Murata Machinery, Ltd., Kyoto-shi, Kyoto (JP)

(72) Inventor: Homare Koumoto, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 339 days.

(21) Appl. No.: 14/842,081

(22) Filed: Sep. 1, 2015

(65) Prior Publication Data
US 2016/0059871 A1 Mar. 3, 2016

(30) Foreign Application Priority Data

Sep. 2, 2014 (JP) ................. 2014-178399

(51) Int. Cl.
*E01B 25/12* (2006.01)
*B61B 3/00* (2006.01)
*B61L 15/00* (2006.01)
*B61L 19/06* (2006.01)
*B61L 23/34* (2006.01)
*B61L 27/00* (2006.01)
*G06Q 10/08* (2012.01)

(52) U.S. Cl.
CPC ............... *E01B 25/12* (2013.01); *B61B 3/00* (2013.01); *B61L 15/0027* (2013.01); *B61L 19/06* (2013.01); *B61L 23/34* (2013.01); *B61L 27/0038* (2013.01); *G06Q 10/08* (2013.01)

(58) Field of Classification Search
CPC ........ B61B 3/00; B61L 15/0027; B61L 19/06; B61L 23/34; B61L 27/0038; B61L 25/025; B61L 2019/065; B61L 2201/00; B61L 27/0077; B61L 13/00; B61L 23/14; B61L 23/16; B61L 25/04; B61L 27/0027; B61L 29/00; B61L 7/00; E01B 25/12; G06Q 10/08; B61J 1/10
See application file for complete search history.

(56) References Cited

U.S. PATENT DOCUMENTS 7,756,613 B2 * 7/2010 Katsuta ................. B61L 11/08
246/14
8,055,397 B2 * 11/2011 Pathak ................... B61L 17/00
104/26.1

(Continued)

FOREIGN PATENT DOCUMENTS

JP 076029 A 1/1995
JP 08091539 A 4/1996

*Primary Examiner* — Mark T Le
(74) *Attorney, Agent, or Firm* — DLA Piper LLP (US)

(57) ABSTRACT

A travelling vehicle system includes an intermediate track; first tracks; second tracks; a first switching track which connects the intermediate track and one of the first tracks to an other one track; and a second switching track which connects the intermediate track and one of the second tracks to the other one track. When a travelling vehicle travels on the intermediate track, a travelling vehicle controller determines before the travelling vehicle enters the first switching track that the travelling vehicle can enter both the first and second switching tracks in the case of determining that the first track on which the travelling vehicle is currently travelling is connected to the intermediate track and determining that the intermediate track is connected to the second track selected by the travelling vehicle.

7 Claims, 7 Drawing Sheets

(56) References Cited

U.S. PATENT DOCUMENTS

| | | | |
|---|---|---|---|
| 8,457,779 B2* | 6/2013 | Lin | B65G 1/0428 104/130.01 |
| 2002/0173884 A1* | 11/2002 | Clawson | G06Q 10/02 701/3 |
| 2010/0232451 A1* | 9/2010 | Groves, Jr. | H04W 72/087 370/431 |
| 2011/0035083 A1* | 2/2011 | Groves | B61L 27/0022 701/19 |
| 2014/0358338 A1* | 12/2014 | Harasaki | H01L 21/67715 701/19 |

* cited by examiner

TRAVELLING VEHICLE SYSTEM

CROSS-REFERENCE TO RELATED APPLICATIONS

This application claims the benefit of priority under 35 USC 119 of Japanese application no. 2014-178399, filed on Sep. 2, 2014, which is incorporated herein by reference.

BACKGROUND OF THE INVENTION

1. Field of the Invention

The present invention relates to a travelling vehicle system for carrying a cargo along a track to transfer the cargo to a rack or the like.

2. Description of the Related Art

There has hitherto been known a travelling vehicle system for allowing a travelling vehicle to travel along a track hung on a ceiling to carry a cargo in the vicinity of the ceiling. The travelling vehicle is provided with a lift stage liftably hung by means of a hanging member. The travelling vehicle transfers the cargo by lowering the lift stage to a placement member of a rack arranged along a travelling route of the travelling vehicle.

The track is installed in accordance with arrangement of the rack. The travelling route formed by the track typically includes a branching part and a merging part . In the branching part and the merging part, a switching track for connecting one track to one of a plurality of tracks is provided. The travelling vehicle selects a travelling route in accordance with a cargo loading/unloading instruction, to load and unload a cargo.

Herein, the travelling vehicle system has a configuration to prevent entry of a travelling vehicle into the switching track, for example, when a track on which the travelling vehicle is currently travelling is not coupled with a track selected by the travelling vehicle (e.g., see Japanese Unexamined Utility Model Application Publication No. 07-6029). The travelling vehicle needs to wait at a position before the track until a permission to enter the switching track is issued by the host controller.

However, in the case of waiting before the switching track, a space for allowing the travelling vehicle to wait is required before the switching track. In this case, there is a problem of limitations on flexibility in design of the track.

The present invention has been made in view of the above problem, and has an object to provide a travelling vehicle system capable of improving flexibility in design of a track.

BRIEF SUMMARY OF THE INVENTION

In order to achieve the above object, a travelling vehicle system according to the present invention includes: a track including an intermediate track, a plurality of first tracks and a plurality of second tracks; a first switching track which connects the intermediate track and one of the plurality of first tracks to another one track; a second switching track which connects the intermediate track and one of the plurality of second tracks to the other one track; a track controller which controls the first switching track and the second switching track; a travelling vehicle which travels along the track; a travelling vehicle controller provided in the travelling vehicle; and a host controller which issues to the travelling vehicle a permission to enter the first switching track and the second switching track. The travelling vehicle controller has an acquisition part which acquires track information showing states of the first switching track and the second switching track, a first track determination part which determines, by use of the track information, whether or not a first track on which the travelling vehicle is currently travelling is connected to the intermediate track by the first switching track, a second track determination part which determines, by use of the track information, whether or not the intermediate track is connected to a second track selected by the travelling vehicle by the second switching track, and an entry determination part which determines whether or not the travelling vehicle can enter both the first switching track and the second switching track when the travelling vehicle travels on the intermediate track. When the first track determination part determines that the first track on which the travelling vehicle is currently travelling is connected to the intermediate track and the second track determination part determines that the intermediate track is connected to the second track selected by the travelling vehicle, the entry determination part determines, before the travelling vehicle enters the first switching track, that the travelling vehicle can enter both the first switching track and the second switching track.

In the travelling vehicle system with the above configuration, the travelling vehicle does not determine whether or not to be able to enter the switching track with respect to each switching track, but determines whether or not to be able to enter a plurality of switching tracks before entering the first switching track. Hence in the travelling vehicle system with the above configuration, the travelling vehicle does not need to wait before the switching track other than the first switching track with respect to each switching track in order to determine whether or not to be able to enter the switching track. Hence a place for making the travelling vehicle wait does not necessarily need to be provided between two adjacent switching tracks, thereby allowing improvement in flexibility in design of the track.

Moreover, in the travelling vehicle system with the above configuration, since the travelling vehicle determines whether or not to be able to enter the plurality of switching tracks before entering the first switching track, the travelling vehicle does not need to stop with respect to each switching track, thereby allowing smooth travelling.

Moreover, the host controller may have a first track control part which outputs, to the track controller before the travelling vehicle enters the first switching track, first connection information for connecting the first track on which the travelling vehicle is currently travelling to the intermediate track and second connection information for connecting the intermediate track to the second track selected by the travelling vehicle, when the travelling vehicle travels on the intermediate track.

In the travelling vehicle system with the above configuration, the host controller does not transmit a switching instruction with respect to each switching track, but transmits switching instructions with respect to a plurality of switching tracks at the time of instructing switching with respect to the first switching track. Hence in the travelling vehicle system with the above configuration, the travelling vehicle can determine whether or not to be able to enter a plurality of switching tracks before entering the first switching track.

Moreover, the host controller further may have a first entry permission issuing part which issues, to the travelling vehicle after transmission of a first completion report showing completion of the connection between the first track on which the travelling vehicle is currently travelling and the intermediate track and transmission of a second completion report showing completion of the connection between the intermediate track and the second track selected by the travelling vehicle from the track controller, a first entry permission for permitting entry into both the first switching track and the second switching track, when the travelling vehicle travels on the intermediate track, and the entry determination part may further determine, after the first entry permission is issued in the host controller, that the travelling vehicle can enter both the first switching track and the second switching track, when the travelling vehicle travels on the intermediate track.

In the travelling vehicle system with the above configuration, since the host controller waits for completion reports from a plurality of switching tracks and then issues an entry permission, the travelling vehicle can more safely travel the switching track.

Moreover, the travelling vehicle controller may further have a third track determination part which determines, by use of the track information, whether or not the first track on which the travelling vehicle is currently travelling is connected to a first track selected by the travelling vehicle by the first switching track, and when the third track determination part determines that the first track on which the travelling vehicle is currently travelling is connected to the first track selected by the travelling vehicle, the entry determination part may further determine, before the travelling vehicle enters the first switching track, that the travelling vehicle can enter the first switching track, when the travelling vehicle does not travel on the intermediate track.

In the travelling vehicle system with the above configuration, when a route on which switching tracks are not successive has been selected by the travelling vehicle, the travelling vehicle can individually determine whether or not to be able to enter the switching tracks on the route.

Moreover, the host controller may further have a second track control part which outputs, to the track controller before the travelling vehicle enters the first switching track, third connection information for connecting the first track on which the travelling vehicle is currently travelling to the first track selected by the travelling vehicle, when the travelling vehicle does not travel on the intermediate track.

In the travelling vehicle system with the above configuration, when a route on which switching tracks are not successive has been selected by the travelling vehicle, the host controller can individually perform switching instructions to the track controller with respect to the switching tracks on the route.

Moreover, the host controller may further have a second entry permission issuing part which issues, to the travelling vehicle after transmission of a third completion report showing completion of the connection between the first track on which the travelling vehicle is currently travelling and the first track selected by the travelling vehicle from the track controller, a second entry permission for permitting entry into the first switching track, when the travelling vehicle does not travel on the intermediate track, and the entry determination part may further determine, after the second entry permission is issued in the host controller, that the travelling vehicle can enter the first switching track, when the travelling vehicle does not travel on the intermediate track.

In the travelling vehicle system with the above configuration, since the host controller waits for completion reports from a plurality of switching tracks and then issues an entry permission, the travelling vehicle can more safely travel the switching track.

Moreover, there may further be included a report part which reports a connection state of the first switching track to the travelling vehicle when the travelling vehicle is travelling on the first switching track.

In the travelling vehicle system with the above configuration, since there is included the report part which reports the state of the switching track when the travelling vehicle is travelling on the switching track, it is possible to further enhance the safety of the travelling vehicle.

According to the present invention, it is possible to improve the flexibility in design of the track in the travelling vehicle system.

DETAILED DESCRIPTION OF PREFERRED EMBODIMENTS

Next, an embodiment of a travelling vehicle system according to the present invention will be described with reference to the drawings. It is to be noted that the following embodiment only shows one example of the travelling vehicle system according to the present invention. Hence the range of the present invention is defined by wording in the claims with reference to the following embodiment, and the present invention is not restricted to the following embodiment.

Embodiment

A travelling vehicle system of an embodiment will be described using FIGS. 1 to 6.

1. Configuration of Travelling Vehicle System

Figure 1:
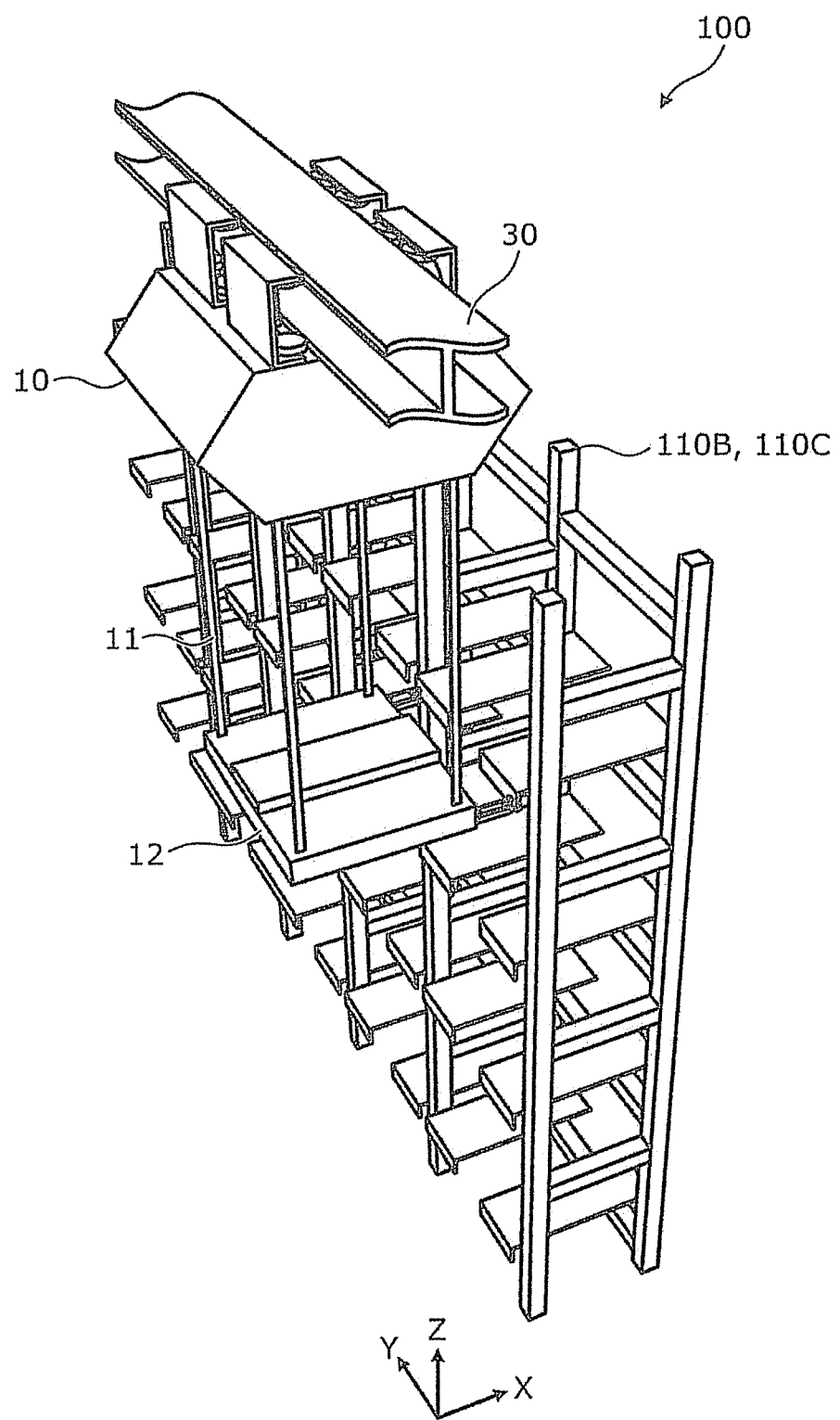
FIG. 1 is a perspective view illustrating a part of a travelling vehicle system.
Figure 2:
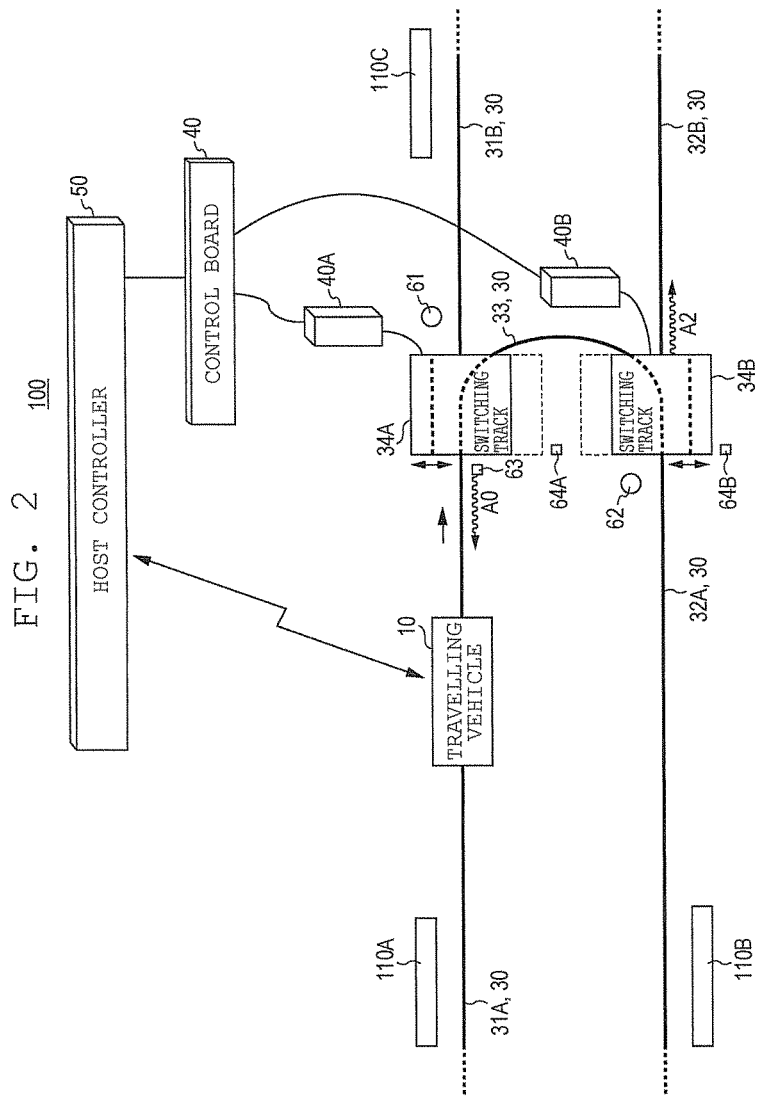
FIG. 2 is a view illustrating one example of a configuration of the travelling vehicle system in an embodiment.
Figure 3:
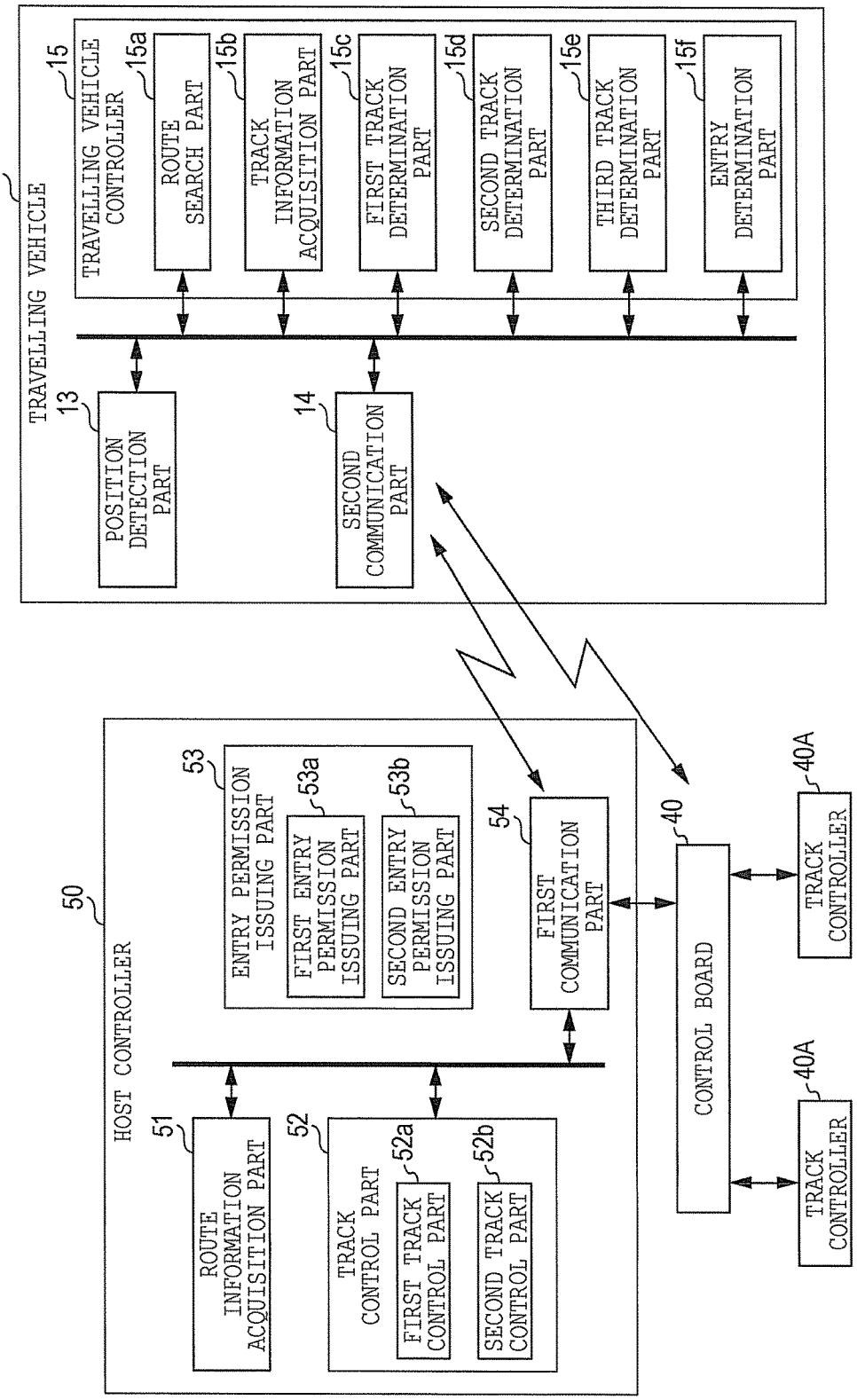
FIG. 3 is a block diagram illustrating one example of the configuration of the travelling vehicle system in the embodiment.

FIG. 1 is a perspective view illustrating a part of the travelling vehicle system. FIG. 2 is a view illustrating one example of a configuration of the travelling vehicle system. FIG. 3 is a block diagram illustrating one example of the configuration of the travelling vehicle system.

A travelling vehicle system 100 is a system for automatically storing and carrying out a cargo. The travelling vehicle system 100 carries a cargo by means of a travelling vehicle 10 which travels along a track 30, and transfers the cargo between racks 110A to 110C and the travelling vehicle 10, to store and carry the cargo.

As illustrated in FIGS. 1 and 2, the travelling vehicle system 100 includes the racks 110A to 110C, the track 30, switching tracks 34A and 34B, track controllers 40A and 40B, a host controller 50, sensors 61 and 62, and the travelling vehicle 10. Although a description will be given of a case where the number of travelling vehicles is one in the present embodiment for the sake of description, the number of travelling vehicles may be larger than one.

The rack 110A is a rack that is used at the time of carrying in and carrying out a cargo. As illustrated in FIG. 1, the racks 110B and 110C are equipment capable of storing cargos along a travelling direction in which the travelling vehicle 10 travels (Y-axis direction in the drawing in the present embodiment). The racks 110A to 110C can further store cargos in a perpendicular direction. In the racks 110A to 110C, placement members for placing and storing cargos are provided in parallel along the travelling direction and the vertical direction (Z-axis direction in the drawing). It is to be noted that the configuration and arrangement of the racks 110A to 110C are not restricted to these.

1-1. Configuration of Track

The track 30 includes an intermediate track 33, first tracks 31A and 31B and second tracks 32A and 32B, and is configured of a rail provided on a ceiling.

The first tracks 31A and 31B and the intermediate track 33 are connected to the switching track 34A. The second track 32A and 32B and the intermediate track are connected to the switching track 34B. In other words, a track made up of the first tracks 31A and 31B is arranged on a route passing through the racks 110A and 110C. Further, a track made up of the second tracks 32A and 32B is arranged on a route passing through the rack 110B. Then, the track made up of the first tracks 31A and 31B and the track made up of the second tracks 32A and 32B are configured such that they can be short-cut by the intermediate track 33.

It is to be noted that the first track 31A may be joined with the second track 32A directly or indirectly on the side different from the intermediate track 33. Similarly, the first track 31B may be joined with the second track 32B directly or indirectly on the side different from the intermediate track 33. That is, the first tracks 31A and 31B and the second tracks 32A and 32B may form one loop-shaped track. In this case, when the travelling vehicle 10 travels on a route passing through the rack 110A and the rack 110B, a route passing through the rack 110C can be short-cut, thereby allowing reduction in a travelling distance and travelling time of the travelling vehicle 10.

In the drawing of FIG. 2, the travelling vehicle 10 travels in one direction (a rightward direction) as to the first tracks 31A and 31B, travels in one direction (a leftward direction) as to the second tracks 32A and 32B, and travels in one direction (a downward direction) as to the intermediate track 33.

In the present embodiment, the intermediate track 33 is arranged between the two switching tracks 34A and 34B. A case where the intermediate track 33 is short and the travelling vehicle 10 cannot wait before the switching track 34B is assumed in the present embodiment. In this case, the travelling vehicle 10 needs to execute the determination as to whether or not to be able to enter the switching tracks 34A and 34B before entering the switching track 34A.

Further, barcodes that store information showing positions on the track 30 are stuck to the track 30 at a plurality of places.

1-2. Configuration of Switching Track

The switching track 34A is one example of a first switching track which connects the intermediate track 33 and one of the first tracks 31P, and 31B to the other one track. The switching track 34A is a switching track provided in a branching part of the track, and couples the first track 31A to the first track 31B or the intermediate track 33. The switching track 34A is configured slidably in a vertical direction in the drawing in accordance with control from the track controller 40A.

On the switching track 34A, there are formed a rail which joins the first track 31A with the intermediate track 33 at the time of sliding in an upward direction in the drawing, and a rail which joins the first track 31A with the first track 31B at the time of sliding in a downward direction in the drawing. By sliding the switching track 34A, the first track 31A can be coupled to either the intermediate track 33 or the first track 31B. FIG. 2 illustrates a state in which the switching track 34A has slid in the upward direction, and the first track 31A is coupled with the intermediate track 33.

The switching track 34B is one example of a second switching track which connects the intermediate track 33 and one of the second tracks 32A and 32B to the other one track. The switching track 34B is a switching track provided in a merging part of the track, and couples the intermediate track 33 or the second track 32B to the first track 31A. The switching track 34B is configured slidably in the vertical direction in the drawing in accordance with control from the track controller 40B.

On the switching track 34B, there are formed a rail which joins the second track 32A with the second track 32B at the time of sliding in the upward direction in the drawing, and a rail which joins the intermediate track 33 with the second track 32A at the time of sliding in the downward direction in the drawing. By sliding the switching track 34B, either the intermediate track 33 or the second track 32B can be connected to the second track 32A. FIG. 2 illustrates a state in which the switching track 34B has slid in the downward direction, and the second track 32A is coupled with the intermediate track 33.

1-3. Configurations of Control Board and Track Controller

A control board 40 accepts a track switching instruction from the host controller 50, and transmits connection information to the track controllers 40A and 40B in accordance with the track switching instruction. Specifically, when the track switching instruction includes first connection information for connecting the first track 31A on which the travelling vehicle 10 is currently travelling to the intermediate track 33, the control board 40 outputs the first connection information to the track controller 40A. When the track switching instruction includes second connection information for connecting the intermediate track 33 to the second track 32A, the control board 40 outputs the second connection information to the track controller 40B. When the track switching instruction includes third connection information for connecting the first track 31A on which the travelling vehicle 10 is currently travelling to the first track 31B, the control board 40 transmits the third connection information to the track controller 40A.

The track controller 40A controls the switching track 34A. Specifically, the track controller 40A accepts connection information showing a track to be connected to the first track 31A, from the host controller 50 via the control board 40. The track controller 40A determines whether or not the track currently connected to the first track 31A agrees with the track shown by the connection information. When the currently connected track agrees with the track shown by the connection information, the track controller 40A outputs a switching completion report to the host controller 50. When the currently connected track does not agree with the track shown by the connection information, the track controller 40A transmits to the switching track 34A a switching request for switching the track connected to the first track 31A to the track shown by the connection information. When switching the track connected to the first track 31A is completed in the switching track 34A, the track controller 40A outputs the switching completion report to the host controller 50.

Since the switching track 34A is provided in the branching part, the connection information stores information showing either the first track 31B or the intermediate track 33 that is a branching destination out of the tracks to be connected to the switching track 34A.

For example, when the track shown by the connection information is the intermediate track 33, the track controller 40A determines whether or not the track connected to the first track 31A that is a branching source by the switching track 34A is the intermediate track 33. When the track connected to the first track 31A by the switching track 34A is the intermediate track 33, the track controller 40A transmits the switching completion report to the host controller 50. When the track connected to the first track 31A by the switching track 34A is the first track 31B, the track controller 40A slides the switching track 34A to couple the first track 31A with the intermediate track 33.

The track controller 40B controls the switching track 34B. A method for controlling the track controller 40B corresponds to a method for controlling the track controller 40A. Specifically, the track controller 40B accepts connection information showing a track to be connected to the second track 32A, from the host controller 50 via the control board 40. The track controller 40B determines whether or not the track currently connected to the second track 32A agrees with the track shown by the connection information. When the currently connected track agrees with the track shown by the connection information, the track controller 40B outputs a switching completion report to the host controller 50. When the currently connected track does not agree with the track shown by the connection information, the track controller 40B transmits to the switching track 34B a switching request for switching the track connected to the second track 32A to the track shown by the connection information. When switching the track connected to the second track 32A is completed in the switching track 34B, the track controller 40B outputs the switching completion report to the host controller 50.

Since the switching track 34B is provided in the merging part, the connection information stores information showing either the second track 32B or the intermediate track 33 that is a merging source out of the tracks to be connected to the switching track 34B.

For example, when the track shown by the connection information is the intermediate track 33, the track controller 40B determines whether or not the track connected to the second track 32A that is a merging destination by the switching track 34B is the intermediate track 33. When the track connected to the second track 32A by the switching track 34B is the intermediate track 33, the track controller 40B transmits the switching completion report to the host controller 50. When the track connected to the second track 32A by the switching track 34B is the second track 32B, the track controller 40B slides the switching track 34B to couple the second track 32A with the intermediate track 33.

1-4. Configuration of Host Controller

The host controller 50 is a controller for controlling the travelling vehicle system in the present embodiment.

As illustrated in FIG. 3, the host controller 50 includes a route information acquisition part 51, a track control part 52, an entry permission issuing part 53, and a first communication part 54.

The route information acquisition part 51 acquires, from the travelling vehicle 10, route information showing a track on which the travelling vehicle 10 is going to travel.

The track control part 52 controls the switching track 34A and 34B. The track control part 52 is provided with a first track control part 52a which performs control when the travelling vehicle 10 travels on the intermediate track 33, and a second track control part 52b which performs control when the travelling vehicle 10 does not travel on the intermediate track 33. When the route information includes the intermediate track 33, the track control part 52 determines that the travelling vehicle 10 travels on the intermediate track 33, and when the route information does not include the intermediate track 33, the track control part 52 determines that the travelling vehicle 10 does not travel on the intermediate track 33.

As described above, the first track control part 52a controls the switching track when the travelling vehicle 10 travels on the intermediate track 33. In this case, since the intermediate track 33 has no place in which the travelling vehicle 10 can wait, an operation is performed so as to complete switching of both the switching track 34A and the switching track 34B before the travelling vehicle 10 enters the switching track 34A. The first track control part 52a outputs, to the control board 40, first connection information for connecting the first track on which the travelling vehicle 10 is currently travelling (herein, the first track 31A) to the intermediate track 33 and second connection information for connecting the intermediate track 33 to the second track selected by the travelling vehicle 10 (herein, the second track 32A)

As described above, the second track control part 52b controls the switching track when the travelling vehicle 10 does not travel on the intermediate track 33. In this case, the switching track 34A may be controlled before the travelling vehicle 10 enters the switching track 34A, and the switching track 34B does not need to be controlled. The second track control part 52b outputs, to the control board 40, third connection information for connecting the first track on which the travelling vehicle 10 is currently travelling (herein, the first track 31A) to the first track selected by the travelling vehicle 10 (herein, the first track 31B).

The entry permission issuing part 53 issues a permission to enter the switching track to the travelling vehicle 10. The entry permission issuing part 53 is provided with a first entry permission issuing part 53a which performs control when the travelling vehicle 10 travels on the intermediate track 33, and a second entry permission issuing part 53b which performs control when the travelling vehicle 10 does not travel on the intermediate track 33.

The first entry permission issuing part 53a issues an entry permission when the travelling vehicle 10 travels on the intermediate track 33. After transmission of a first completion report showing completion of the connection between the first track 31A on which the travelling vehicle 10 is currently travelling and the intermediate track 33 and transmission of a second completion report showing completion of the connection between the intermediate track 33 and the second track 32A from the control board 40, the first entry permission issuing part 53a transmits to the travelling vehicle 10 a first entry permission for permitting entry into both the first switching track 34A and the second switching track 34B.

The second entry permission issuing part 53*b* issues an entry permission when the travelling vehicle 10 does not travel on the intermediate track 33. After transmission of the first completion report showing completion of the connection between the first track 31A on which the travelling vehicle 10 is currently travelling and the intermediate track 33 from the control board 40, the second entry permission issuing part 53*b* transmits to the travelling vehicle 10 a second entry permission for permitting entry into the first switching track 34A.

The first communication part 54 performs wired communication with the control board 40, and performs wireless communication with a second communication part 14 of the travelling vehicle 10.

1-5. Configurations of Sensor and Report Part

The sensor 61 is a sensor for detecting a state of the switching track 34A, and the sensor 62 is a sensor for detecting a state of the switching track 34B.

Based on outputs from the sensor 61 and the sensor 62, a report part 63 outputs, to the travelling vehicle travelling on the first track 31A, a report signal A0 including first track information showing a track connected to the first track 31A and second track information showing a track connected to the second track 32A.

The report signal A0 is a signal having a directivity of increased strength in a direction of the first track 31A. A reaching range of the report signal A0 is limited. When the travelling vehicle 10 travelling on the first track 31A enters the reaching range of the report signal A0, the travelling vehicle 10 can receive the report signal A0. By analyzing the report signal A0, the travelling vehicle 10 can detect states of both the switching track 34A and the switching track 34B.

It is to be noted that the report signal A0 is not restricted to the signal with the above configuration. For example, the report signal A0 may be a signal which is transmitted to the travelling vehicle 10 when a signal line with a certain length is arranged before the switching track 34A (i.e., on the first track 31A) and the travelling vehicle 10*a* approaches to the vicinity of the signal line.

Based on outputs from the sensor 61 and the sensor 62, a report part 64A outputs a report signal A1 (not illustrated) including the first track information to the travelling vehicle travelling on the switching track 34A.

Based on outputs from the sensor 61 and the sensor 62, a report part 64B outputs a report signal A2 (not illustrated) including the second track information to the travelling vehicle travelling on the switching track 34B.

With the report part 63 having the directivity, the travelling vehicle 10 cannot receive the report signal A0 on the switching track 34A and the switching track 34B. By provision of the report part 64A and the report part 64B, the travelling vehicle 10 can detect the states of the switching tracks 34A and 34B even during travelling on the switching track 34A or 34B.

1-6. Configuration of Travelling Vehicle

The travelling vehicle 10 is a travelling vehicle that travels along the track, and travels while being hung on the track 30.

As illustrated in FIG. 1, the travelling vehicle 10 is equipped with a hanging member 11 and a lift stage 12. The hanging member 11 is a member for connecting the travelling vehicle 10 to the lift stage 12 to hang the lift stage 12 on the travelling vehicle 10. The hanging member 11 is a member having flexibility to such an extent as to be reelable and it is, for example, a metal wire or chain. In the present embodiment, the lift stage 12 is hung by use of four hanging members 11. The lift stage 12 is a stage that holds a cargo while being hung on the travelling vehicle by the hanging members 11. In the present embodiment, the lift stage 12 is provided with a transfer device capable of transferring the cargo between the racks 110A to 110C and the lift stage 12.

In the present embodiment, the travelling vehicle 10 travels by driving a motor with electric power that is fed via a power feeder wired along the track 30. It is to be noted that the travelling vehicle 10 maybe configured so as to receive power supply from a mounted battery. The travelling vehicle 10 further includes a motor capable of reeling the hanging member 11, and can reel or send out the hanging member 11, to lift or lower the lift stage 12 hung by the hanging member 11.

As illustrated in FIG. 3, the travelling vehicle 10 includes a position detection part 13, the second communication part 14 and a travelling vehicle controller 15.

The position detection part 13 detects the position of the travelling vehicle 10 on the track. The position detection part 13 is configured of optical equipment that reads a barcode attached to the track 30 and outputs a reading result to the travelling vehicle controller 15. The barcode includes information showing a position, and the travelling vehicle controller 15 can acquire position information by analyzing the information shown by the barcode.

The second communication part 14 is configured to be wirelessly communicable with the first communication part 54 of the host controller 50. In the present embodiment, the second communication part 14 can communicate during travelling.

The travelling vehicle controller 15 is a controller for controlling movement of the travelling vehicle 10 and transfer of a cargo. The travelling vehicle controller 15 is provided with a route search part 15*a*, a track information acquisition part 15*b*, a first track determination part 15*c*, a second track determination part 15*d*, a third track determination part 15*e*, and an entry determination part 15*f*.

The route search part 15*a* receives a cargo loading/unloading instruction from the host controller 50, and selects a track on which the travelling vehicle 10 is allowed to travel based on the instruction. The cargo loading/unloading instruction includes information showing a cargo receiving rack (position) and a cargo unloading rack (position). In the present embodiment, for example when the first track and the second track form a loop-shaped route and when the travelling vehicle 10 is allowed to travel on a route not including the rack 110C, the route search part 15*a* selects the first track 31A, the intermediate track 33 and the second track 32A. When the first track and the second track form the loop-shaped route and when the travelling vehicle 10 is allowed to travel on the route including the rack 110C, the route search part 15*a* selects the first tracks 31A and 313 and the second tracks 32A and 32B. The route search part 15*a* generates information showing the selected track as route information showing a track on which the travelling vehicle 10 is going to travel. The route search part 15*a* outputs the generated route information to the route information acquisition part Si of the host controller 50. Although the switching track can also be derived from the selected track, information of the switching track may be included in the route information.

The track information acquisition part 15*b* is one example of an acquisition part which acquires the first track information showing the state of the switching track 34A and the second track information showing the state of the switching track 34B. In the present embodiment, a description will be given of a case where the track information acquisition part 15*b* acquires the first track information and the second track information from the report part 63, but the track information acquisition part 15*b* may acquire the first track information and the second track information from another device such as the control board 40, the track controller 40A and the track controller 40B.

By using the first track information, the first track determination part 15*c* determines whether or not the first track 31A on which the travelling vehicle 10 is currently travelling is connected to the intermediate track 33 by the switching track 34A. In the present embodiment, the first track determination part 15*c* performs determination when the travelling vehicle travels on the intermediate track, namely when the intermediate track 33 is included in the track selected by the route search part 15*a*.

By using the second track information, the second track determination part 15*d* determines whether or not the intermediate track 33 is connected to the second track selected by the travelling vehicle 10 by the switching track 34B. The second track selected by the travelling vehicle 10 is the second track selected by the route search part 15*a*. When the travelling vehicle 10 travels on the route not including the rack 110C, the selected second track is the second track 32A. In the present embodiment, the second track determination part 15*d* performs determination when the travelling vehicle 10 travels on the intermediate track 33.

By using the first track information, the third track determination part 15*e* determines whether or not the first track 31A on which the travelling vehicle 10 is currently travelling is connected to the first track selected by the travelling vehicle 10 by the switching track 34A. In the present embodiment, the third track determination part 15*e* performs determination when the travelling vehicle 10 does not travel on the intermediate track 33, namely when the intermediate track 33 is not included in the track set by the route search part 15*a*.

The entry determination part 15*f* determines whether or not the travelling vehicle 10 can enter the switching track. The timing for determination by the entry determination part 15*f* is before the travelling vehicle 10 enters the first switching track 34A. It is to be noted that conditions for determination by the entry determination part 15*f* are different between when the travelling vehicle 10 travels on the intermediate track 33 and when the travelling vehicle 10 does not travel on the intermediate track 33.

When the travelling vehicle 10 travels on the intermediate track 33, the entry determination part 15*f* determines that the travelling vehicle 10 can enter both the switching tracks 34A and 34B in the case of satisfying three conditions: (condition 1) the first track determination part 15*c* has determined that the first track 31A is connected to the intermediate track 33; (condition 2) the second track determination part 15*d* has determined that the intermediate track 33 is connected to the second track 32A; and (condition 3) the host controller 50 has issued the first entry permission. When the conditions (condition 1) to (condition 3) are not all satisfied, the entry determination part 15*f* determines that the travelling vehicle 10 cannot enter the switching track 34A. It is to be noted that the above conditions may be further added with a condition that the switching completion report has been received from the control board 40.

When the travelling vehicle 10 does not travel on the intermediate track 33, the entry determination part 15*f* determines that the travelling vehicle 10 can enter the switching track 34A in the case of satisfying two conditions: (condition 4) the first track determination part 15*c* has determined that the first track 31A is connected to the first track 31B; and (condition 5) the host controller 50 has issued the second entry permission. When the conditions (condition 4) and (condition 5) are not both satisfied, the entry determination part 15*f* determines that the travelling vehicle 10 cannot enter the switching track 34A. It is to be noted that the above conditions may be further added with a condition that the switching completion report has been received from the control board 40.

2. Method for Controlling Travelling Vehicle System

An operation of the travelling vehicle system will be described by use of FIGS. 4 and 5. In the following, the case where the travelling vehicle 10 travels on the intermediate track 33 and the case where it does not travel on the intermediate track 33 will be separately described.

2-1. Case Where Travelling Vehicle Travels on Intermediate Track

Figure 4:
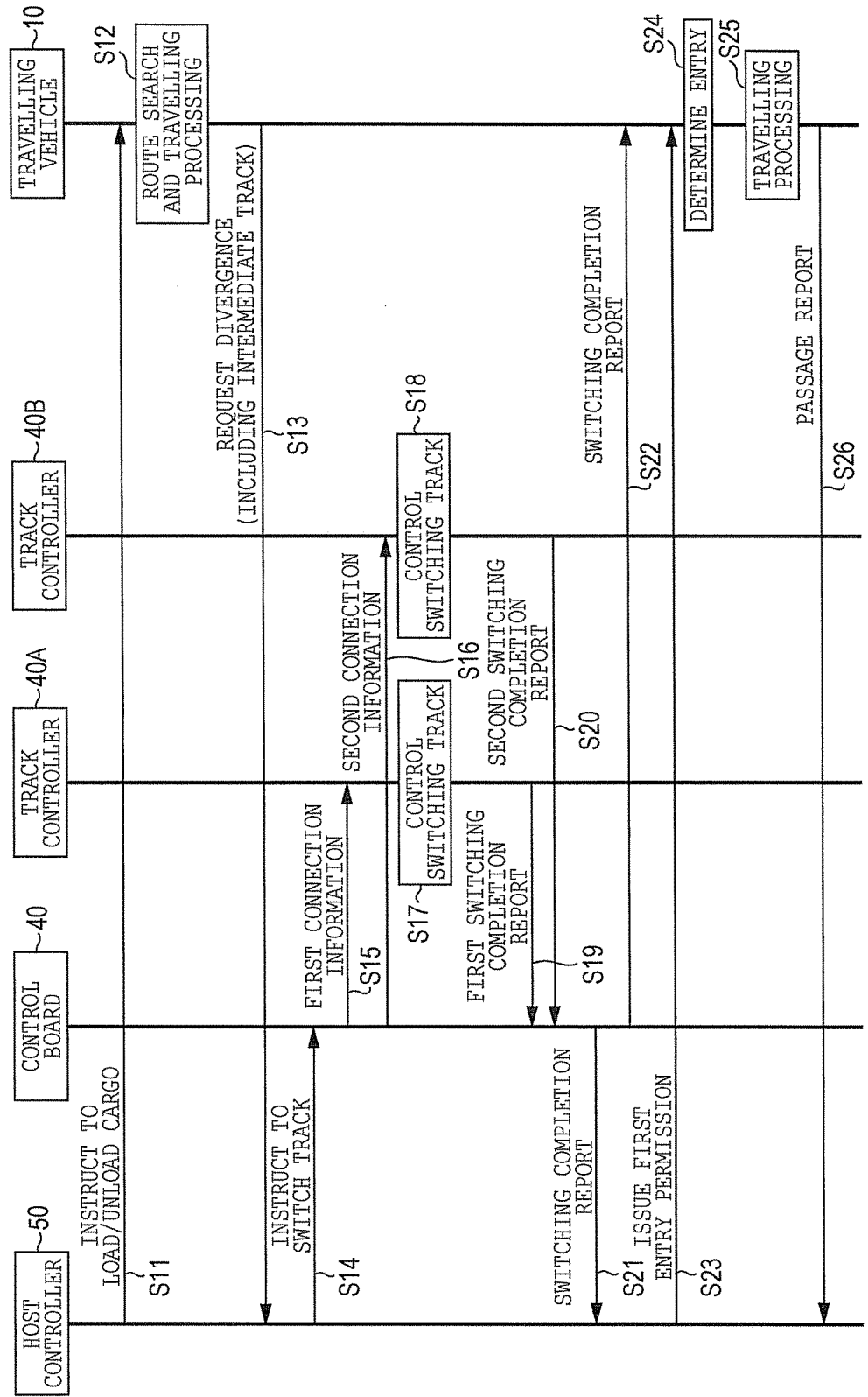
FIG. 4 is a sequence diagram illustrating an operation of the travelling vehicle system according to the embodiment.

FIG. 4 is a sequence diagram illustrating an operation of the travelling vehicle system in the present embodiment. FIG. 4 illustrates the case where the travelling vehicle 10 travels on the intermediate track 33.

The host controller 50 transmits a cargo loading/unloading instruction to the travelling vehicle 10 (S11). The cargo loading/unloading instruction includes information of a cargo loading position and a cargo unloading position. Herein, a description will be given of the case of instructing the travelling vehicle 10 that the rack 110A illustrated in FIG. 2 is taken as the cargo loading position and the rack 110B illustrated in FIG. 2 is taken as the cargo unloading position. Further, a description will be given by taking as an example a case where the host controller 50 transmits the cargo loading/unloading instruction when the travelling vehicle 10 is located before the rack 110A of the first track 31A.

As illustrated in FIG. 4, by the route search part 15*a*, the travelling vehicle 10 searches a route on which it travels in accordance with the cargo loading/unloading instruction (S12). As described above, in order to be headed for the rack 110B from the rack 110A, a route taking the first track 31A, the intermediate track 33 and the second track 32A, namely a route taking the intermediate track 33, is selected herein. In other words, the route search part 15*a* selects the first track 31A, the intermediate track 33 and the second track 32A as tracks on which the travelling vehicle 10 travels.

When the route search part 15*a* selects the route, it starts travelling processing of the travelling vehicle 10. The travelling vehicle 10 travels on the first track 31A, loads a cargo in the rack 110A, and further travels toward the switching track 34A.

By the position detection part 13, the travelling vehicle 10 reads a barcode stuck to the track 30 and detects the position while travelling. The timing for detecting the position is the timing at which the travelling vehicle 10 passes through the barcode.

The travelling vehicle controller 15 of the travelling vehicle 10 monitors a result of the position detection by the position detection part 13, and when approaching the switching track 34A within a certain range therefrom, the travelling vehicle controller 15 transmits a branching request to the host controller (S13). The branching request includes first connection information for connecting the first track 31A to the intermediate track 33 by the switching track 34A and second connection information for connecting the intermediate track 33 to the second track 32A by the switching track 34B. The first connection information is information showing the intermediate track 33. The second connection information is information showing the second track 32A.

The host controller 50 acquires the branching request via the first communication part 54, and acquires the first connection information and the second connection information from the branching request. By the first track control part 52a, the host controller 50 outputs a track switching instruction including the first connection information and the second connection information to the control board 40 (S14). In other words, the first track control part 52a outputs the first connection information to the track controller 40A via the control board 40, and outputs the second connection information to the track controller 40B via the control board 40.

The control board 40 outputs the first connection information to the track controller 40A (S15), and outputs the second connection information to the track controller 40B (S16).

The track controller 40A controls the switching track 34A in accordance with the first connection information (S17). When the first track 31A is not connected to the intermediate track 33 by the switching track 34A, the track controller 40A slides the switching track 34A to connect the first track 31A to the intermediate track 33. After sliding the switching track 34A, the track controller 40A outputs to the control board 40 a first switching completion report showing completion of the connection between the first track 31A and the intermediate track 33. When the first track 31A is connected to the intermediate track 33 by the switching track 34A, the track controller 40A immediately outputs the first switching completion report to the control board 40.

The track controller 40B controls the switching track 34B in accordance with the second connection information (S18). When the intermediate track 33 is not connected to the second track 32A by the switching track 34B, the track controller 40B slides the switching track 34B to connect the intermediate track 33 to the second track 32A. After sliding the switching track 34B, the track controller 40B outputs to the control board 40 a second switching completion report showing completion of the connection between the intermediate track 33 and the second track 32A. When the intermediate track 33 is connected to the second track 32A by the switching track 34B, the track controller 40B immediately outputs the second switching completion report to the control board 40.

After receiving both the first switching completion report from the track controller 40A and the second switching completion report from the track controller 40B (S19, S20), the control board 40 transmits to the host controller 50 a switching completion report including the first switching completion report and the second switching completion report (S21). Further, after receiving both the first switching completion report from the track controller 40A and the second switching completion report from the track controller 40B (S19, S20), the control board 40 also transmits the switching completion report to the travelling vehicle 10 (S22)

When receiving the switching completion report from the control board 40 by the first entry permission issuing part 53a, the host controller 50 issues to the travelling vehicle 10 a first entry permission for permitting entry into both the switching track 34A and the switching track 34B (S23).

By the entry determination part 15f, the travelling vehicle 10 determines whether or not to be able to enter both the switching track 34A and the switching track 34B (S24).

As described above, the travelling vehicle 10 determines that it can enter both the switching tracks 34A and 34B in the case of satisfying the three conditions of (condition 1) to (condition 3), namely: (condition 1) the first track determination part 15c has determined that the first track 31A is connected to the intermediate track 33; (condition 2) the second track determination part 15d has determined that the intermediate track 33 is connected to the second track 32A; and (condition 3) the host controller 50 has issued the first entry permission.

Herein, when the second communication part 14 of the travelling vehicle 10 approaches the switching track 34A and enters a reaching range of a report signal outputted from the report part 63, the second communication part 14 receives the report signal. The track information acquisition part 15b acquires track information showing the states of the switching tracks 34A and 34B from the report signal received by the second communication part 14.

The first track determination part 15c acquires the state of the switching track 34A from the track information acquired by the track information acquisition part 15b. When the track information includes information showing that first track 31A is connected to the intermediate track 33 by the switching track 34A, the first track determination part 15c determines that the first track 31A is connected to the intermediate track 33.

The second track determination part 15d acquires the state of the switching track 34B from the track information acquired by the track information acquisition part 15b. When the track information includes information showing that the intermediate track 33 is connected to the second track 32A selected by the route search part 15a by the switching track 34B, the second track determination part 15d determines that the intermediate track 33 is connected to the second track 32A.

When the travelling vehicle 10 determines by the entry determination part 15f that it can enter both the switching track 34A and the switching track 34B, the travelling vehicle 10 travels on the switching track 34A, the intermediate track 33 and the switching track 34B, and enters the second track 32A (S25)

It is to be noted that in the present embodiment, the travelling vehicle controller 15 of the travelling vehicle 10 monitors the report signal A1 from the report part 64A and the report signal A2 from the report part 64B while travelling on the switching track 34A. When the travelling vehicle controller 15 determines that abnormality occurs on the switching track 34A or 34B, such as a case where the switching track 34B slides during travelling on the switching track 34A, the travelling vehicle controller 15 stops the travelling vehicle 10 and informs the host controller 50 of the occurrence of the abnormality.

After travelling on the switching track 34A and the switching track 34B, the travelling vehicle 10 transmits to the host controller 50 a passage report showing completion of passage through the switching track 34A and the switching track 34B (S26).

2-2. Case Where Travelling Vehicle Does Not Travel on Intermediate Track

Figure 5:
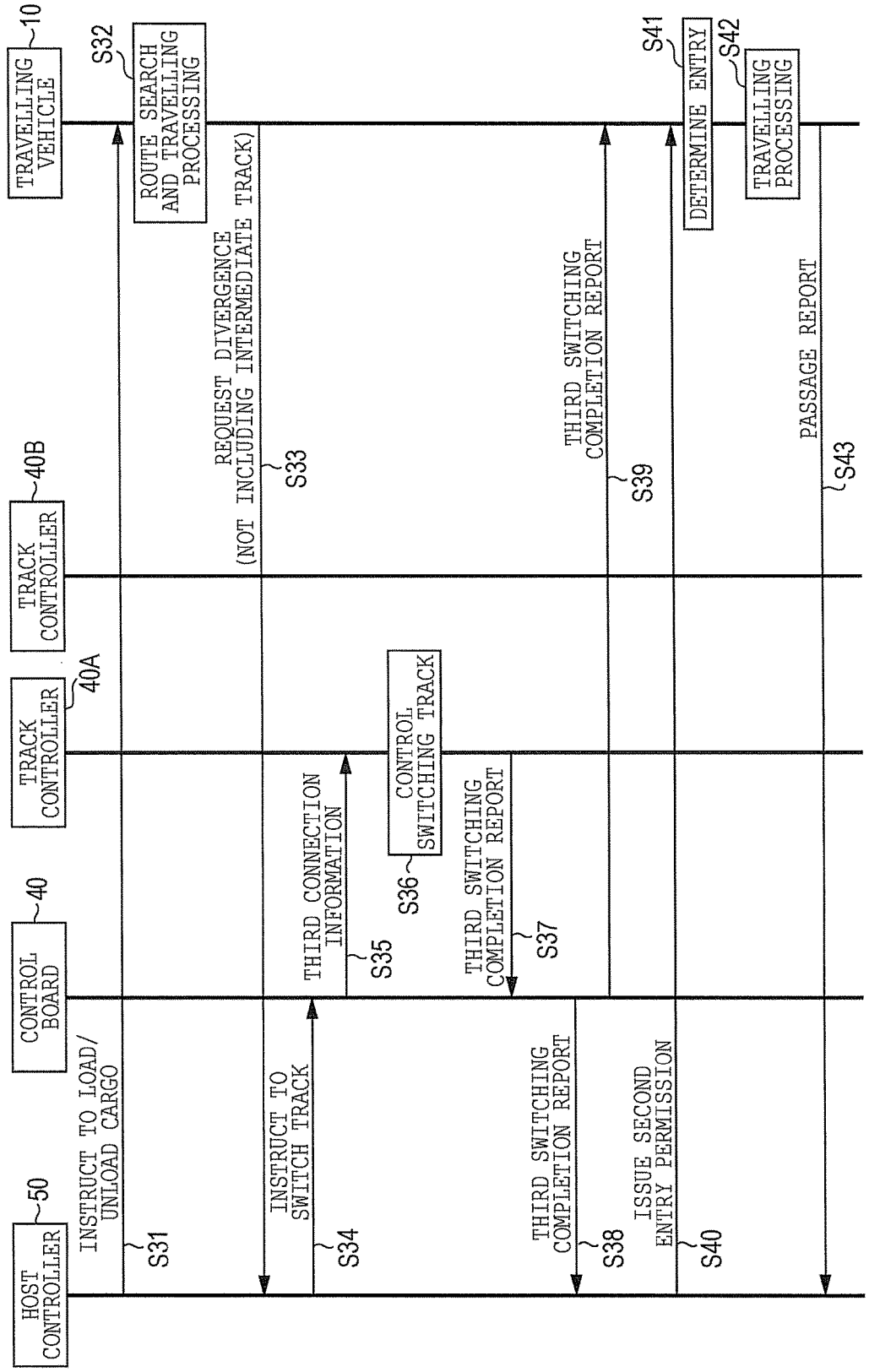
FIG. 5 is a sequence diagram illustrating the operation of the travelling vehicle system according to the embodiment.

FIG. 5 is a sequence diagram illustrating the operation of the travelling vehicle system in the present embodiment.

FIG. 5 illustrates the case where the travelling vehicle 10 does not travel on the intermediate track 33.

The host controller 50 transmits a cargo loading/unloading instruction to the travelling vehicle 10 (S31). Herein, a description will be given by taking as an example a case of instructing the travelling vehicle 10 that the rack 110A illustrated in FIG. 2 is taken as the cargo loading position and the rack 110C illustrated in FIG. 2 is taken as the cargo unloading position. Further, similarly to the case illustrated in FIG. 4, a description will be given by taking as an example a case where the host controller 50 transmits the cargo loading/unloading instruction when the travelling vehicle 10 is located before the rack 110A of the first track 31A.

As illustrated in FIG. 5, by the route search part 15a, the travelling vehicle 10 searches a route on which it travels in accordance with the cargo loading/unloading instruction (S32). As described above, in order to be headed for the rack 110C from the rack 110A, a route taking the first tracks 31A and 31B, namely a route not taking the intermediate track 33, is selected.

When the route search part 15a selects the route, the travelling vehicle 10 starts travelling processing. The travelling vehicle 10 travels on the first track 31A, loads a cargo in the rack 110A, and further travels toward the switching track 34A.

Similarly to the case illustrated in FIG. 4, by the position detection part 13, the travelling vehicle 10 reads a barcode stuck to the track 30 and detects the position while travelling.

The travelling vehicle controller 15 of the travelling vehicle 10 monitors a result of the position detection by the position detection part 13, and when approaching the switching track 34A within a certain range therefrom, the travelling vehicle controller 15 transmits a branching request to the host controller (S33). The branching request includes third connection information for connecting the first track 31A to the first track 31B by the switching track 34A. The third connection information is information showing the first track 31B.

The host controller 50 acquires the branching request via the first communication part 54, and acquires the third connection information from the branching request. By the second track control part 52b, the host controller 50 outputs a track switching instruction including the third connection information to the control board 40 (S34). In other words, the second track control part 52b outputs the third connection information to the track controller 40A via the control board 40.

The control board 40 outputs the third connection information to the track controller 40A (S35).

The track controller 40A controls the switching track 34A in accordance with the third connection information (S36). When the first track 31A is not connected to the first track 31B by the switching track 34A, the track controller 40A slides the switching track 34A to connect the first track 31A to the first track 31B. After sliding the switching track 34A, the track controller 40A outputs to the control board 40 a third switching completion report showing completion of the connection between the first track 31A and the first track 31B. When the first track 31A is connected to the first track 31B by the switching track 34A, the track controller 40A immediately outputs the third switching completion report to the control board 40.

After receiving the third switching completion report from the track controller 40A (S37), the control board 40 transmits the third switching completion report to the host controller 50 (S38). Further, after receiving the third switching completion report from the track controller 40A (S37), the control board 40 also transmits the third switching completion report to the travelling vehicle 10 (S39).

When receiving the third switching completion report from the control board 40 by the second entry permission issuing part 53b, the host controller 50 issues to the travelling vehicle 10 a second entry permission for permitting entry into the switching track 34A (S40).

By the entry determination part 15f, the travelling vehicle 10 determines whether or not to be able to enter the switching track 34A (S41).

As described above, the travelling vehicle 10 determines that it can enter the switching tracks 34A in the case of satisfying the two conditions of (condition 4) and (condition 5), namely: (condition 4) the first track determination part 15c has determined that the first track 31A is connected to the first track 31B; and (condition 5) the host controller 50 has issued the second entry permission.

Herein, similarly to the case illustrated in FIG. 4, when the second communication part 14 of the travelling vehicle 10 approaches the switching track 34A and enters a reaching range of a report signal outputted from the report part 63, the second communication part 14 receives the report signal. The track information acquisition part 15b receives track information showing the states of the switching tracks 34A and 34B from the report signal received by the second communication part 14.

The third track determination part 15e acquires the state of the switching track 34A from the track information acquired by the track information acquisition part 15b. Although the track information includes information of the switching track 34B, it is not used in this case. When the track information includes information showing that first track 31A is connected to the first track 31B by the switching track 34A, the third track determination part 15e determines that the first track 31A is connected to the first track 31B.

When the travelling vehicle 10 determines by the entry determination part 15f that it can enter the switching track 34A, the travelling vehicle 10 travels on the switching track 34A and enters the first track 31B (S42)

It is to be noted that in the present embodiment, the travelling vehicle controller 15 of the travelling vehicle 10 monitors the report signal A1 from the report part 64A while travelling on the switching track 34A. When the travelling vehicle controller 15 determines that abnormality occurs during travelling on the switching track 34A, it stops the travelling vehicle 10 and informs the host controller 50 of the occurrence of the abnormality.

After travelling on the switching track 34A, the travelling vehicle 10 transmits to the host controller 50 a passage report showing completion of passage through the switching track 34A (S43).

3. Effects, Etc.

In the above embodiment, since the travelling vehicle 10 determines whether or not to be able to enter the plurality of switching tracks before entering the switching track 34A, the travelling vehicle 10 does not need to wait before the switching track through which it passes secondly or thereafter in order to determine whether or not to be able to enter the switching track. Hence a place for making the travelling vehicle wait does not necessarily need to be ensured between two adjacent switching tracks, thereby allowing improvement in flexibility in design of the track.

Further, in the above embodiment, since the travelling vehicle 10 performs collective determination on states of the plurality of switching tracks, the travelling vehicle 10 does not need to stop with respect to each switching track, and can thus travel smoothly.

4. Alternative Embodiments

In the above embodiment, the description has been given of the case where the switching track 34A provided in the branching part and the switching track 34B provided in the merging part are collectively determined, but this is not restrictive.

4-1. Alternative Embodiment 1

Figure 6:
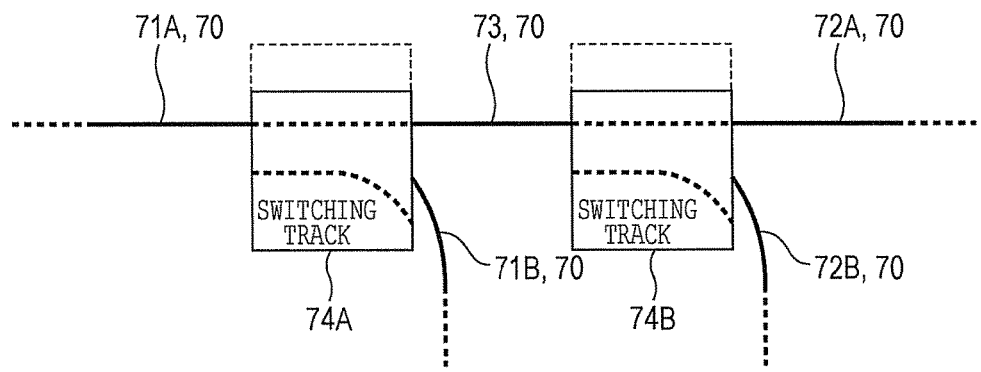
FIG. 6 is a view illustrating one example of a configuration of a track in a first alternative embodiment.

FIG. 6 is a view illustrating one example of a configuration of a track in a first alternative embodiment.

A track 70 includes an intermediate track 73, first tracks 71A and 71B and second tracks 72A and 72B, and is configured of a rail provided on a ceiling.

The first tracks 71A and 71B and the intermediate track 73 are connected to a switching track 74A. The second tracks 72A and 72B and the intermediate track are connected to a switching track 74B.

The switching tracks 74A and 74B are switching tracks each provided in a branching part of the track.

The switching track 74A couples the first track 71A to the first track 71B or the intermediate track 73. The switching track 74B couples the intermediate track 73 to the second track 72A or 72B.

It is to be noted that in the present alternative embodiment, for example when the route search part 15a of the travelling vehicle controller 15 selects the first track 71A, the intermediate track 73 and the second track 72A, the first track determination part 15c determines whether or not the first track 71A is connected to the intermediate track 73. The second track determination part 15d determines whether or not the intermediate track 73 is connected to the second track 72A.

Also in the present alternative embodiment, similarly to the embodiment, since the travelling vehicle 10 determines whether or not to be able to enter the plurality of switching tracks before entering the switching track 74A, the travelling vehicle 10 does not need to wait before the switching track through which it passes secondly or thereafter in order to determine whether or not to be able to enter the switching track. Hence it is possible to improve the flexibility in design of the track, so as to allow smooth travelling.

4-2. Second Alternative Embodiment

Figure 7:
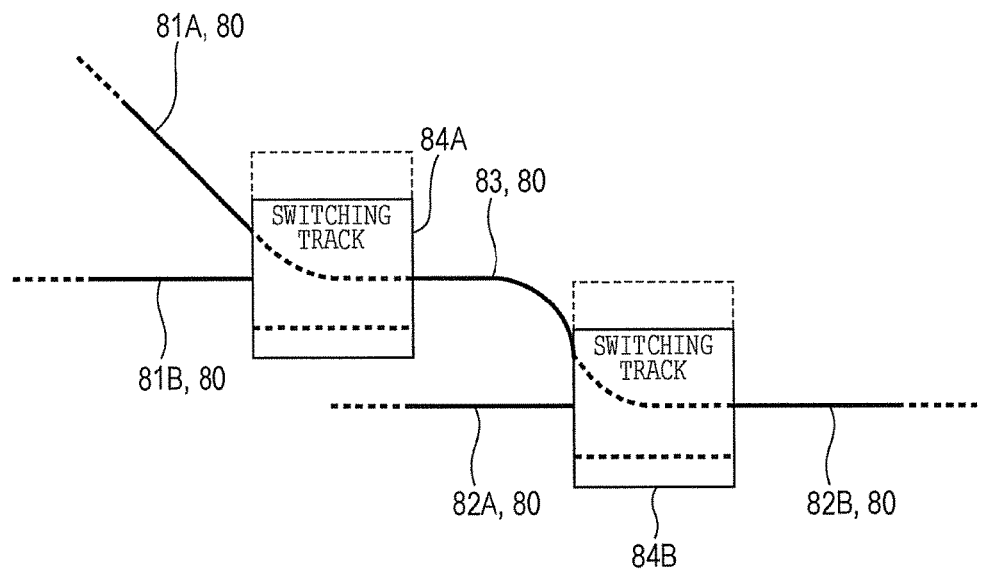
FIG. 7 is a view illustrating one example of a configuration of a track in a second alternative embodiment.

FIG. 7 is a view illustrating one example of a configuration of a track in a second alternative embodiment.

A track 80 includes an intermediate track 83, first tracks 81A and 81B and second tracks 82A and 82B, and is configured of a rail provided on a ceiling.

The first tracks 81A and 81B and the intermediate track 83 are connected to the switching track 84A. The second tracks 82A and 82B and the intermediate track are connected to the switching track 84B.

The switching tracks 84A and 84B are switching tracks each provided in a merging part of the track.

The switching track 84A couples the first track 81A or 81B to the intermediate track 83. The switching track 84B couples the intermediate track 83 or the second track 82A to the second track 82B.

It is to be noted that in the present alternative embodiment, for example when the route search part 15a of the travelling vehicle controller 15 selects the first track 81A, the intermediate track 83 and the second track 82B, the first track determination part 15c determines whether or not the first track 81A is connected to the intermediate track 83. The second track determination part 15d determines whether or not the intermediate track 83 is connected to the second track 82B.

Also in the present alternative embodiment, similarly to the embodiment and the first alternative embodiment, since the travelling vehicle 10 determines whether or not to be able to enter the plurality of switching tracks before entering the switching track 84A, the travelling vehicle 10 does not need to wait before the switching track through which it passes secondly or thereafter in order to determine whether or not to be able to enter the switching track. Hence it is possible to improve the flexibility in design of the track, so as to allow smooth travelling.

4. Third Alternative Embodiment

Figure 8:
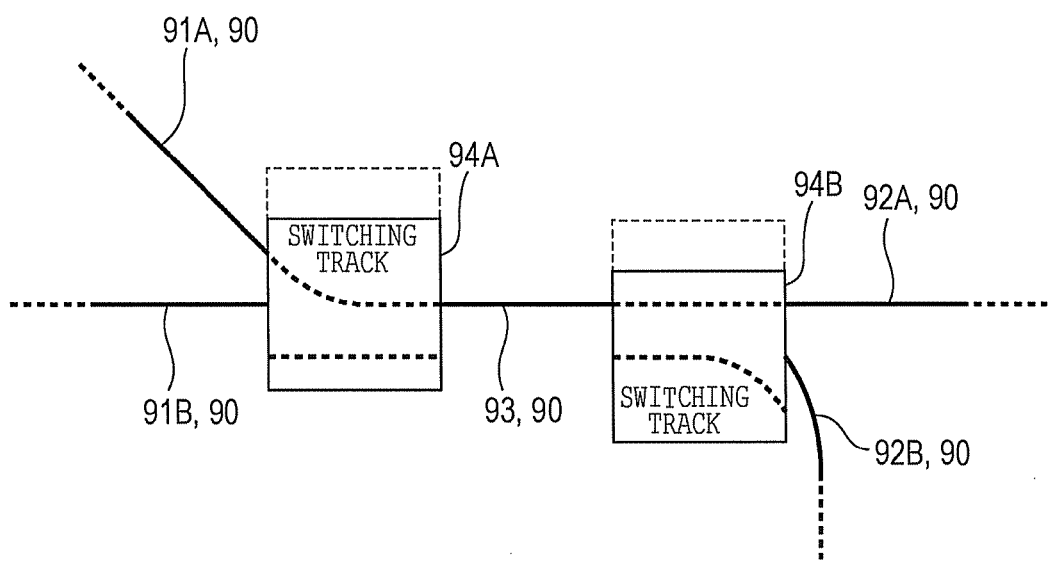
FIG. 8 is a view illustrating one example of a configuration of a track in a third alternative embodiment.

FIG. 8 is a view illustrating one example of a configuration of a track in a third alternative embodiment.

A track 90 includes an intermediate track 93, first tracks 91A and 91B and second tracks 92A and 92B, and is configured of a rail provided on a ceiling.

The first tracks 91A and 91B and the intermediate track 93 are connected to the switching track 94A. The second tracks 92A and 92B and the intermediate track are connected to the switching track 94B.

The switching track 94A is a switching track provided in a merging part of the track, and the switching track 94B is a switching track provided in a branching part of the track.

The switching track 94A couples the first track 91A or 91B to the intermediate track 93. The switching track 94B couples the intermediate track 93 to the second track 92A or 92B.

It is to be noted that in the present alternative embodiment, for example when the route search part 15a of the travelling vehicle controller 15 selects the first track 91A, the intermediate track 93 and the second track 92A, the first track determination part 15c determines whether or not the first track 91A is connected to the intermediate track 93. The second track determination part 15d determines whether or not the intermediate track 93 is connected to the second track 92A.

Also in the present alternative embodiment, similarly to the embodiment and the first and second alternative embodiments, since the travelling vehicle 10 determines whether or not to be able to enter the plurality of switching tracks before entering the switching track 94A, the travelling vehicle 10 does not need to wait before the switching track through which it passes secondly or thereafter in order to determine whether or not to be able to enter the switching track. Hence it is possible to improve the flexibility in design of the track, so as to allow smooth travelling.

Other Embodiments

It is to be noted that the present invention is not restricted to the above embodiment. For example, another embodiment realized by arbitrarily combining the constituents described in the present specification or excluding some of the constituents may be taken as an embodiment of the present invention. Further, the present invention includes an alternative embodiment obtained by making a variety of modifications conceived by a person skilled in the field on the above embodiment in a range not deviating from the gist of the present invention, namely the meaning shown by wording recited in the claims.

The present invention is available for an automatic warehouse, a factory and the like in which a cargo is carried in the vicinity of a ceiling and stored in a rack.

What is claimed is:

1. A travelling vehicle system comprising:
 a track including an intermediate track, a plurality of first tracks and a plurality of second tracks;
 a first switching track which connects the intermediate track and one of the plurality of first tracks to an other one track;
 a second switching track which connects the intermediate track and one of the plurality of second tracks to the other one track;
 a track controller which controls the first switching track and the second switching track;
 a travelling vehicle which travels along the track;
 a travelling vehicle controller provided in the travelling vehicle; and
 a host controller which issues to the travelling vehicle a permission to enter the first switching track and the second switching track,
 wherein
 the travelling vehicle controller has
 an acquisition part which acquires track information showing states of the first switching track and the second switching track,
 a first track determination part which determines, by use of the track information, whether or not a first track on which the travelling vehicle is currently travelling is connected to the intermediate track by the first switching track,
 a second track determination part which determines, by use of the track information, whether or not the intermediate track is connected to a second track selected by the travelling vehicle by the second switching track, and
 an entry determination part which determines whether or not the travelling vehicle can enter both the first switching track and the second switching track when the travelling vehicle travels on the intermediate track, and
 when the first track determination part determines that the first track on which the travelling vehicle is currently travelling is connected to the intermediate track and the second track determination part determines that the intermediate track is connected to the second track selected by the travelling vehicle, the entry determination part determines, before the travelling vehicle enters the first switching track, that the travelling vehicle can enter both the first switching track and the second switching track.

2. The travelling vehicle system according to claim 1, wherein
 the host controller has
 a first track control part which outputs, to the track controller before the travelling vehicle enters the first switching track, first connection information for connecting the first track on which the travelling vehicle is currently travelling to the intermediate track and second connection information for connecting the intermediate track to the second track selected by the travelling vehicle, when the travelling vehicle travels on the intermediate track.

3. The travelling vehicle system according to claim 2, wherein
 the host controller further has
 a first entry permission issuing part which issues, to the travelling vehicle after transmission of a first completion report showing completion of the connection between the first track on which the travelling vehicle is currently travelling and the intermediate track and transmission of a second completion report showing completion of the connection between the intermediate track and the second track selected by the travelling vehicle from the track controller, a first entry permission for permitting entry into both the first switching track and the second switching track, when the travelling vehicle travels on the intermediate track, and
 the entry determination part further determines, after the first entry permission is issued in the host controller, that the travelling vehicle can enter both the first switching track and the second switching track, when the travelling vehicle travels on the intermediate track.

4. The travelling vehicle system according to claim 1, wherein
 the travelling vehicle controller further has
 a third track determination part which determines, by use of the track information, whether or not the first track on which the travelling vehicle is currently travelling is connected to a first track selected by the travelling vehicle by the first switching track, and
 when the third track determination part determines that the first track on which the travelling vehicle is currently travelling is connected to the first track selected by the travelling vehicle, the entry determination part further determines, before the travelling vehicle enters the first switching track, that the travelling vehicle can enter the first switching track, when the travelling vehicle does not travel on the intermediate track.

5. The travelling vehicle system according to claim 2, wherein
 the host controller further has
 a second track control part which outputs, to the track controller before the travelling vehicle enters the first switching track, third connection information for connecting the first track on which the travelling vehicle is currently travelling to the first track selected by the travelling vehicle, when the travelling vehicle does not travel on the intermediate track.

6. The travelling vehicle system according to claim 5, wherein
 the host controller further has
 a second entry permission issuing part which issues, to the travelling vehicle after transmission of a third completion report showing completion of the connection between the first track on which the travelling vehicle is currently travelling and the first track selected by the travelling vehicle from the track controller, a second entry permission for permitting entry into the first switching track, when the travelling vehicle does not travel on the intermediate track, and
 the entry determination part further determines, after the second entry permission is issued in the host controller, that the travelling vehicle can enter the first switching track, when the travelling vehicle does not travel on the intermediate track.

7. The travelling vehicle system according to claim 1, further comprising a report part which reports to the travelling vehicle about a connection state of the first switching track when the travelling vehicle is travelling on the first switching track.

\* \* \* \* \*